US010585650B1

(12) United States Patent
Dowe et al.

(10) Patent No.: US 10,585,650 B1
(45) Date of Patent: Mar. 10, 2020

(54) METHOD AND SYSTEM FOR GENERATING PROGRAM CODE

(71) Applicant: dSPACE digital signal processing and control engineering GmbH, Paderborn (DE)

(72) Inventors: Zein Dowe, Paderborn (DE); Michael Mair, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 16/230,468

(22) Filed: Dec. 21, 2018

(51) Int. Cl.
*G06F 8/35* (2018.01)
*G06F 8/33* (2018.01)
*G06F 8/10* (2018.01)

(52) U.S. Cl.
CPC .................. *G06F 8/35* (2013.01); *G06F 8/10* (2013.01); *G06F 8/33* (2013.01)

(58) Field of Classification Search
CPC ....................................................... G06F 8/35
USPC ........................................................ 717/104
See application file for complete search history.

(56) References Cited

U.S. PATENT DOCUMENTS

| | | | | |
|---|---|---|---|---|
| 6,691,301 | B2* | 2/2004 | Bowen ................ | G06F 17/5045 712/15 |
| 8,204,732 | B1* | 6/2012 | Simsek ..................... | G06F 8/34 703/16 |
| 9,329,840 | B1* | 5/2016 | Koh ........................... | G06F 8/35 |
| 2004/0210685 | A1* | 10/2004 | Orofino, II .......... | G06F 17/5009 710/22 |
| 2004/0243978 | A1* | 12/2004 | Walmsley ............ | B41J 2/04505 717/120 |
| 2010/0153910 | A1* | 6/2010 | Ciolfi ........................ | G06F 8/34 717/105 |
| 2010/0175045 | A1* | 7/2010 | Ciolfi ........................ | G06F 8/34 717/105 |

(Continued)

OTHER PUBLICATIONS

José Carlos Molina Fraticelli; "Simulink Code Generation: Tutorial for generating C code from Simulink Models using Simulink Coder"; NASA.gov website; Apr. 25, 2012 (Year: 2012).*

(Continued)

*Primary Examiner* — Qing Chen
*Assistant Examiner* — Clint Thatcher
(74) *Attorney, Agent, or Firm* — Muncy, Geissler, Olds & Lowe, P.C.

(57) ABSTRACT

A computer-implemented method for generating program code based on one or more blocks of a block diagram in a technical computing environment including a model editor and a code generator. The method comprises opening the block diagram in the model editor, the block diagram comprising a delay block that delays a signal received by an input port for a number of periods before being emitted at an output port, determining that a composite signal is connected to the input port, and generating definitions for variables, the variables including a state buffer, a pointer and an index. The method further comprises generating loop code, the loop code comprising instructions for setting the pointer to a position in the state buffer with an offset of index, instructions for outputting elements from the state buffer, instructions for inputting the composite signal to the state buffer, and instructions for adjusting the index.

20 Claims, 3 Drawing Sheets

(56) References Cited

U.S. PATENT DOCUMENTS

2011/0010160 A1* 1/2011 Pree .................. G06F 8/10
                                                        703/21
2011/0078652 A1* 3/2011 Mani .................. G06F 8/10
                                                        717/105

OTHER PUBLICATIONS

"Transport Delay"; Mathworks.com website [full url in ref.], as captured by the Wayback Machine Internet Archive (archive.org) on Mar. 31, 2018 (Year: 2018).*
"Simulink Style Guide, V 1.0"; NewEagle.net website [full url in ref.]; May 12, 2010 (Year: 2010).*
Hanselmann et al.; "Production Quality Code Generation from Simulink Block Diagrams"; Proceedings of the 1999 IEEE International Symposium on Computer Aided Control System Design (Year: 1999).*

* cited by examiner

METHOD AND SYSTEM FOR GENERATING PROGRAM CODE

BACKGROUND OF THE INVENTION

Field of the Invention

The present invention relates to methods and computer systems for automatically generating code from block diagrams, the code preferably being used in electronic control units.

Description of the Background Art

Electronic control units (ECUs) are ubiquitous especially in automotive applications; generally, they may contain a processor, such as a microcontroller, one or more sensor interfaces and one or more circuits to control an actuator. Current parameters of a physical process are preferably determined using the signals of the one or more sensors connected to the sensor interfaces. Based on a predefined control strategy, the processor may control the one or more circuits to apply the actuators for influencing the physical process. For example, an ECU may be used to perform anti-lock braking, with a sensor measuring the wheel velocity and a magnetic valve reducing the pressure in the corresponding wheel brakes.

In order to speed up the development process for ECUs, control strategies are preferably developed using block diagrams in a technical computing environment (TCE), such as MATLAB/Simulink of The MathWorks, which allows for tracing the temporal behavior of a physical system described by one or more blocks in the block diagram. Block diagrams are generally periodically executable, so that e.g. a new value is determined for each block every millisecond. The document "Production Quality Code Generation from Simulink Block Diagrams", Proceedings of the 1999 IEEE International Symposium on Computer Aided Control System Design, Kohala-Coast, Hi., USA, by H. Hanselmann et al. describes a system for automatically generating production code based on a block diagram containing one or more blocks that specify the functionality of the program, such as a control program for an ECU that implements the desired control strategy.

Block diagrams for control functions often comprise delay blocks; due to the periodic execution, an inefficient implementation of the delay block restricts the available processor time and thus hinders the use of more advanced control strategies in target systems with limited computing power.

Thus, improved methods for generating source code are needed; it would be particularly desirable to provide for an efficient implementation of a delay for structured signals that may comprise a large quantity of elements.

SUMMARY OF THE INVENTION

It is therefore an object of the present invention to provide methods and computer systems for automatically generating source code from a block diagram comprising a detailed implementation of the program.

In an exemplary embodiment of the invention, a computer-implemented method for generating program code based on one or more blocks of a block diagram in a technical computing environment is provided. The technical computing environment comprises a model editor and a code generator and is being executed by at least one processor of a host computer. The inventive method comprises opening the block diagram in the model editor, the block diagram comprising a delay block, wherein a signal received by an input port of the delay block is delayed by a number n of periods before being emitted at an output port of the delay block, wherein n is an integer greater than or equal to one, and determining that a composite signal comprising a number w of elements is connected to the input port of the delay block, wherein w is an integer greater than one. Further, the inventive method comprises generating definitions for variables, the variables comprising a state buffer, a pointer and an index, wherein the state buffer is of a type corresponding to that of the composite signal but comprises n times as many elements, so that the state buffer comprises n sets of elements, wherein the pointer points to a subset comprising a number s of elements of the state buffer, wherein s is an integer greater than or equal to one, wherein the index is an integer and is initially set to zero, and generating loop code, the loop code comprising instructions for setting the pointer to a position in the state buffer with an offset of index elements, instructions for outputting the set of elements from the state buffer beginning at the pointer position, instructions for inputting a set of elements of the composite signal to the state buffer beginning at the pointer position, instructions for adding w divided by s to the index and instructions for limiting the index to a value of n times w divided by s via a modulo operation.

Advantageously, the generated code implements a circular buffer, thus obviating the need to periodically copy signal values from one part of the buffer to the next for delays longer than one. All elements of the state buffer are preferably initialized with zero after definition of the variable. By using a selection pointer, the generated code maintains good readability and efficiency.

The host computer may be realized as a single standard computer comprising a processor, such as a general-purpose microprocessor, a display device and an input device. Alternatively, the host computer system may comprise one or more servers comprising a plurality of processing elements, the servers being connected to a client comprising a display device and an input device via a network. Thus, the technical computing environment may be executed partially or completely on a remote server, such as in a cloud computing setup, so that preferably only a graphical user interface of the technical computing environment is executed locally. The block diagram may comprise multiple blocks with input and/or output signals that are connected to output and/or input signals of other blocks. Each block may be an atomic functional unit or may be a hierarchical block that is composed of a plurality of subordinate blocks.

In an embodiment, generating variable definitions comprises defining an output buffer, the data type of the output buffer corresponding to that of the composite signal, wherein outputting elements from the state buffer comprises copying the values of said elements from the state buffer to the output buffer. The code generated for the block downstream of the delay block generally comprises reading the values in the output buffer. By using a dedicated output buffer, consistency of the values for all elements of the composite signal can be assured.

In an embodiment, generating variable definitions comprises defining an input buffer, the data type of the input buffer corresponding to that of the composite signal, and wherein inputting elements of the composite signal to the state buffer comprises copying the values of said elements from the input buffer to the state buffer. The code generated for the block upstream of the delay block generally comprises writing values to the input buffer.

The composite signal can be a vector, such as a vector comprising integer or floating-point numbers, wherein s equals one. For a vector signal, the pointer preferably addresses one element of the vector.

The composite signal can be a matrix, such as a matrix comprising integer or floating-point numbers, wherein w is divisible by s.

For the case of a matrix signal, w divided by s equals the number of rows of the matrix, so that the subset addressed by the pointer is one row of the matrix, and the instructions outputting the set of elements from the state buffer comprise instructions for sequentially addressing the rows in one set of elements and instructions for sequentially outputting the elements contained in the row currently addressed. Given that the roles of columns and rows in a two-dimensional matrix can be interchanged, this is intended to encompass the case of w denoting the number of elements per column.

The data type of the elements of the composite signal may be a scalar type or a composite type, such as a vector or a structure. Thus, code generated for a delay block based on the inventive method can also be applied for composite signals of higher dimensionality and/or complexity.

In an embodiment, copying all elements of the set or subset can be done via an unrolled loop, provided that the value of w or s is lower than a predefined threshold. This allows for adaptively optimizing the code by preferring speed over size up to a given limit while maintaining a compact also for large composite signals.

Advantageously, code generated by the inventive method is MISRA-compliant. Compliance to a coding standard such as MISRA ensures easy use of the code in later development stages.

The technical computing environment can comprise a data definition tool, the method further comprising retrieving generation settings for the variables from the data definition tool. Generation settings may comprise data types and scalings for variables in the generated code.

A method for generating program code based on one or more blocks of a periodically executable block diagram in a technical computing environment is also provided. The technical computing environment comprises a model editor and a code generator and is being executed by at least one processor of a host computer. The inventive method comprises opening the block diagram in the model editor, the block diagram comprising a delay block with a first and a second input port, wherein a signal received by the first input port of the delay block is delayed by a number n of time steps before being emitted at an output port of the delay block, wherein n is determined via a signal received at the second input port, wherein n is an integer greater than or equal to one and smaller than or equal to a predetermined maximum value d, wherein d is an integer greater than one, and determining that a composite signal comprising a number w of elements is connected to the first input port of the delay block, wherein w is an integer greater than one. Further, the inventive method comprises generating definitions for variables, the variables comprising a state variable, a read pointer, a write pointer and an index, wherein the read pointer and the write pointer point to a subset comprising a number s of elements of the composite signal, respectively, wherein s is an integer greater than or equal to one, wherein the state variable is of a type corresponding to that of the composite variable, but comprises d times as many elements, so that the state buffer comprises n sets of elements, wherein the index is an integer and is initially set to zero, and generating loop code, the loop code comprising instructions for setting the write pointer to a position determined by the beginning of the state variable and a write offset of index, setting the read pointer to a position determined by the beginning of the state variable and a read offset of index plus d minus n times w divided by s, wherein the read offset is limited to d times w divided by s via a modulo operation, outputting the set of elements beginning at the read pointer position from the state variable, inputting a set of elements of the composite signal to the state variable beginning at the write pointer position, and adding w divided by s to the index, wherein the index is limited to d times w divided by s via a modulo operation.

Advantageously, the inventive method allows for providing a delay that can be varied during execution time via a second signal up to a predefined maximum delay.

A non-transitory computer-readable medium is also provided that contains instructions that, when executed by a microprocessor of a computer system, cause the computer system to carry out the inventive method.

A computer system is also provided which comprises a host computer that comprises a processor, a random-access memory, a graphics controller connected to a display, a serial interface connected to at least one human input device, and a nonvolatile memory, in particular a hard disk or a solid-state disk. The nonvolatile memory comprises instructions that, when executed by the processor, cause the computer system to carry out the inventive method. In an embodiment, the computer system further comprises an embedded system connected to the host computer, the embedded system comprising a target processor.

The processor may be a general-purpose microprocessor that is customary used as the central processing unit of a personal computer or it may comprise one or a plurality of processing elements adapted for carrying out specific calculations, such as a graphics-processing unit. In embodiments of the invention, the processor may be replaced or complemented by a programmable logic device, such as a field-programmable gate array, which is configured to provide a defined set of operations and/or may comprise an IP core microprocessor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
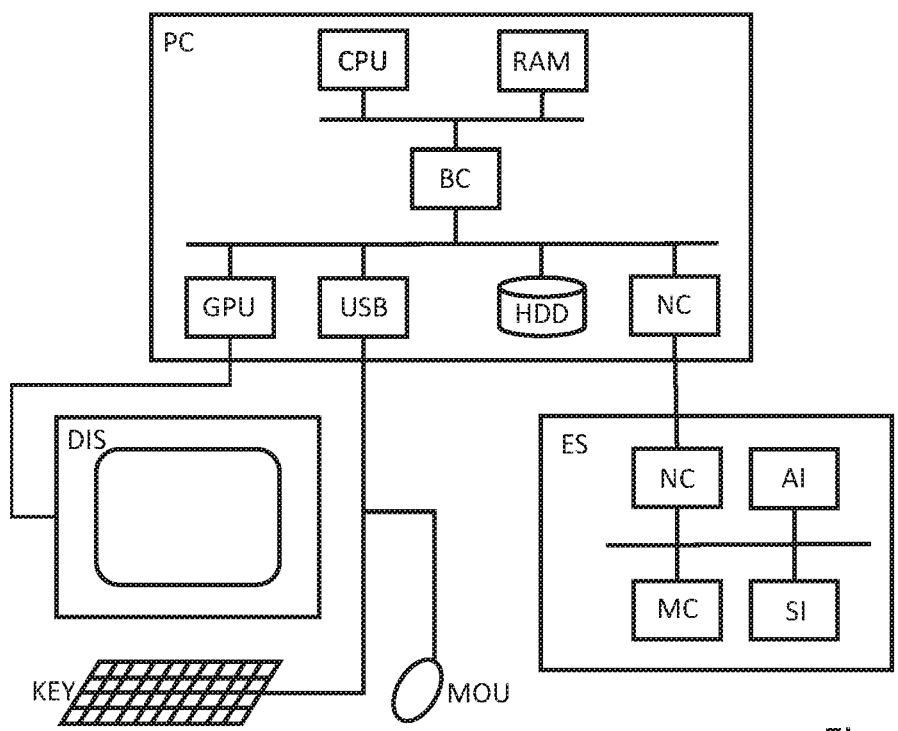
FIG. 1 is an exemplary diagram of a computer system.

FIG. 1 illustrates an exemplary embodiment of a computer system.

The shown embodiment comprises a host computer PC with a display DIS and human interface devices such as a keyboard KEY and a mouse MOU; further, an embedded system ES is depicted, which may e.g. be used for a processor-in-the-loop simulation.

The host computer PC comprises at least one processor CPU with one or multiple cores, a random-access memory RAM and a number of devices connected to a local bus (such as PCI Express), which exchanges data with the CPU via a bus controller BC. The devices comprise e.g. a graphics-processing unit GPU for driving the display, a controller USB for attaching peripherals, a non-volatile memory HDD such as a hard disk or a solid-state disk, and a network interface NC. Preferably, the non-volatile memory comprises instructions that, when executed by one or more cores of the processor CPU, cause the computer system to carry out a method according to one of the claims.

The embedded system ES comprises a network interface NC, an actuator interface AI and a sensor interface SI as well as a microcontroller MC. As an alternative or addition to the microcontroller MC, the embedded system ES may comprise a programmable logic device such as a field-programmable gate array. The programmable logic device may contain a hardwired digital signal processor and it may be configured to comprise an IP core microprocessor. Preferably, the embedded system ES is connected to the personal computer PC via the network interface NC, which may e.g. be of USB, RS-232 or Ethernet type. The embedded system may comprise a non-volatile memory that comprises instructions to be carried out by the microcontroller or a configuration to be loaded on the programmable logic device.

In embodiments, the host computer may comprise one or more servers comprising one or more processing elements, the servers being connected to a client comprising a display device and an input device via a network. Thus, the technical computing environment may be executed partially or completely on a remote server, such as in a cloud computing setup. A personal computer may be used as a client comprising a display device and an input device via a network. Alternatively, a graphical user interface of the technical computing environment may be displayed on a portable computing device, in particular a portable computing device with a touch screen interface.

In embodiments, the computer system may not comprise an embedded system ES. While the embedded system ES is useful for carrying out a processor-in-the-loop simulation of a control program, the presence of an embedded system is not necessary for carrying out at least some aspects of the present invention.

Figure 2:
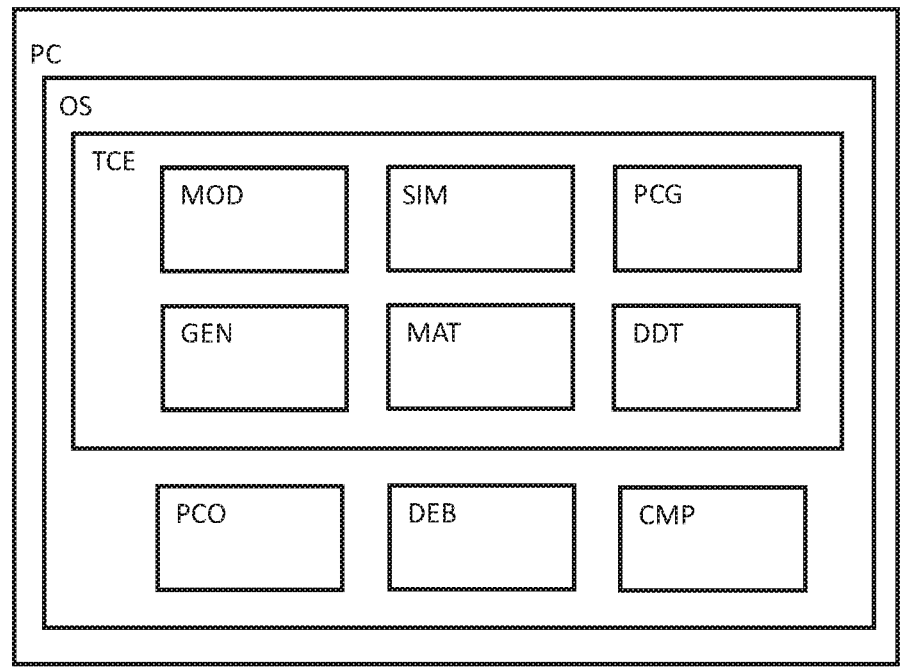
FIG. 2 is an exemplary diagram of software components in a computer system.

FIG. 2 displays an exemplary embodiment of the software components being executed on a computer system, which may be realized as a host computer PC with a standard microprocessor that runs a standard operating system OS such as Microsoft Windows or a Linux distribution.

On the host computer PC, a technical computing environment TCE such as MATLAB/Simulink of The MathWorks may be installed. Other examples of technical computing environments comprise LabVIEW of National Instruments or ASCET of ETAS. The technical computing environment TCE comprises a plurality of software components such as a model editor MOD and a simulation engine SIM. Additionally, the TCE may comprise a mathematical and/or script interpreter MAT that is adapted for carrying out calculations or modifying data. The TCE comprises a production code generator PCG that is adapted to produce production code from a model; further, it comprises a data definition tool DDT and it may comprise a documentation generator. The expression that a software component is comprised in the TCE is intended to encompass the case that the software component uses a specific mechanism of the TCE such as an application-programming interface of the TCE in order to exchange data and/or instructions with other software components in the TCE. For example, a software component may be realized as or comprise an add-on such as a toolbox for the model editor.

The model editor MOD may provide a graphical user interface for creating and modifying block diagrams that preferably describe the temporal behavior of a dynamic system. Additionally, blocks adapted for describing finite states and conditions for transitions between states may be used to model the dynamic system. A block may describe an atomic operation, such as an arithmetic calculation or a logic expression, or it may represent a subsystem that is described in more detail by an additional or partial block diagram in a subordinate hierarchical level. This need not imply that the partial block diagram is stored in a separate file, but rather that the functionality of a hierarchical block is defined by a plurality of blocks in a subordinate level. Alternatively, it may contain code in a higher-level programming language, in particular a dynamic language intended for mathematical programming, that realizes the block's functionality. Multiple blocks may be connected by signals for the exchange of data. For example, an initial block may receive a signal of type single as input signal, may modify the signal e.g. by adding a constant and may send an output signal of type double to a further block. It may be said that the further block is downstream of the initial block because they are connected by a signal path so that data flows from the initial block to the further block.

The simulation engine SIM may be adapted to execute a block diagram created in the model editor MOD in order to observe the temporal behavior of the dynamic system described by the block diagram. The execution of a block diagram may also be called a model-in-the-loop simulation of the dynamic system and is preferably carried out using high-precision operations in order to observe the behavior more closely and to create reference data.

The production code generator PCG allows for creating production code from one or more blocks in a block diagram. Production code may be optimized for readability, traceability, safety, low-energy consumption, execution speed and/or memory requirements. Preferably, the code generator provides a user interface for setting a plurality of options for adapting the customization of the generated code. Customization options may include target-specific optimizations for the microcontroller of the embedded system and enforcing compliance of the generated code to a specific standard, such as the MISRA C guidelines. A particularly preferred production code generator PCG is TargetLink of dSPACE.

The data definition tool DDT provides a local or remote database for storing definitions and parameters as well as an application-programming interface for automatic exchange of the data between different software components. The term "database" is to be understood in a broad sense, so that a file with a tree structure may be considered a database. A data definition tool allows for a clean separation of the model of the dynamic system given in the block diagram from implementation-specific details stored in the database. When a complex model is structured in different sub-models, data in different sub-models may be linked. By storing corresponding information in the data definition tool, these dependencies may be automatically resolved. Additionally, by exchanging data with a software architecture tool, the data definition tool DDT can be used as part of a higher-level tool chain, so as to generate product code compliant to the AUTOSAR standard. A preferred data definition tool is TargetLink Data Dictionary of dSPACE.

A documentation generator GEN may be adapted to traverse the block diagram and generate a documentation based on the definitions in the documentation blocks. The documentation may comprise information from the data definition tool DDT and/or data from external data sources. Other software components such as a production code compiler PCO, a debugger DEB or a comparison tool CMP may also be installed on the computer. These software components may be interfaced to each other and/or the technical computing environment using standard mechanisms of the underlying operating system OS. The compiler PCO may generate an executable for the microprocessor of the PC or it may generate an object code for the microcontroller of the embedded system. Additionally, it may be configured to generate additional debugging information and to include it in the executable. In this way, the debugger DEB can e.g. be used for observing the value of a signal during a software-in-the-loop simulation of the generated production code. Depending on the intended use, the observed values may be directly displayed to the user and/or they may be logged in a memory, e.g. in RAM, in a file or a database.

Figure 3:
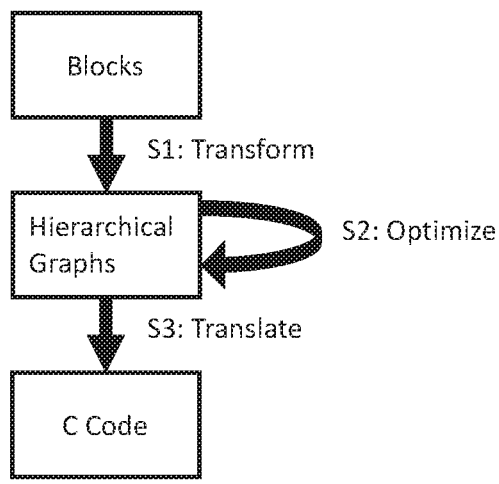
FIG. 3 is an exemplary diagram of a method for generating production code from a block diagram.

FIG. 3 illustrates an exemplary embodiment of the generation of production code from one or more blocks in a block diagram. The following steps are preferably carried out by a microprocessor on the host computer; alternatively, a client server setup may be used so that computationally expensive steps are carried on a remote server containing a plurality of microprocessors.

In a first step S1, the selected one or more blocks (or, if selected, the entire block diagram) and related input data are transformed to an intermediate representation such as one or more hierarchical graphs. These hierarchical graphs may in particular comprise a data flow graph, a control flow graph and/or a tree structure. Related input data may e.g. be extracted from a database associated with the block diagram. This may encompass situations where elements of the block diagram are created based on information from a data definition tool, or where settings relevant for the production code generation are retrieved from the data definition tool.

In a second step S2, the hierarchical graphs are optimized in order to reduce the number of variables required and/or the number of operations or instructions to be carried out. This optimization may comprise a plurality of intermediate steps on further intermediate representations between block level and production code level. In each step, an initial set of hierarchical graphs or an intermediate language is converted to a modified set of hierarchical graphs or an intermediate language while applying one or more optimization rules. A number of strategies such as constant folding or elimination of dead code may be applied during optimization.

In a third step S3, the optimized intermediate representations such as optimized hierarchical graphs are translated to code in a high-level or low-level programming language, preferably C code. The code may be further optimized in this step and restricted to a subset of the linear or parallel programming language, the control and dataflow structures may be restricted to precisely specified variants, the scope of functions and data may be restricted according to accurately specified rules. Alternatively or in addition, additional information may be added to the code, e.g. in the form of comments, to enhance readability or help in debugging the code.

During or after the code generation, information on the current block diagram or the code generation, especially results of the code generation, may again be stored in a database such as the data definition tool. This information may e.g. be used to initialize the simulation engine, to influence a compilation process with a production code compiler, or to export production code information for use in other tools/process, like e.g. calibration and measurement information in ASAP2 format (in particular a variable description file) or AUTOSAR XML information. Preferably, a documentation is generated automatically after production code generation has been finished. In embodiments, hardware-level code or a configuration for a programmable hardware device may be created from the blocks describing the control program.

Figure 4:
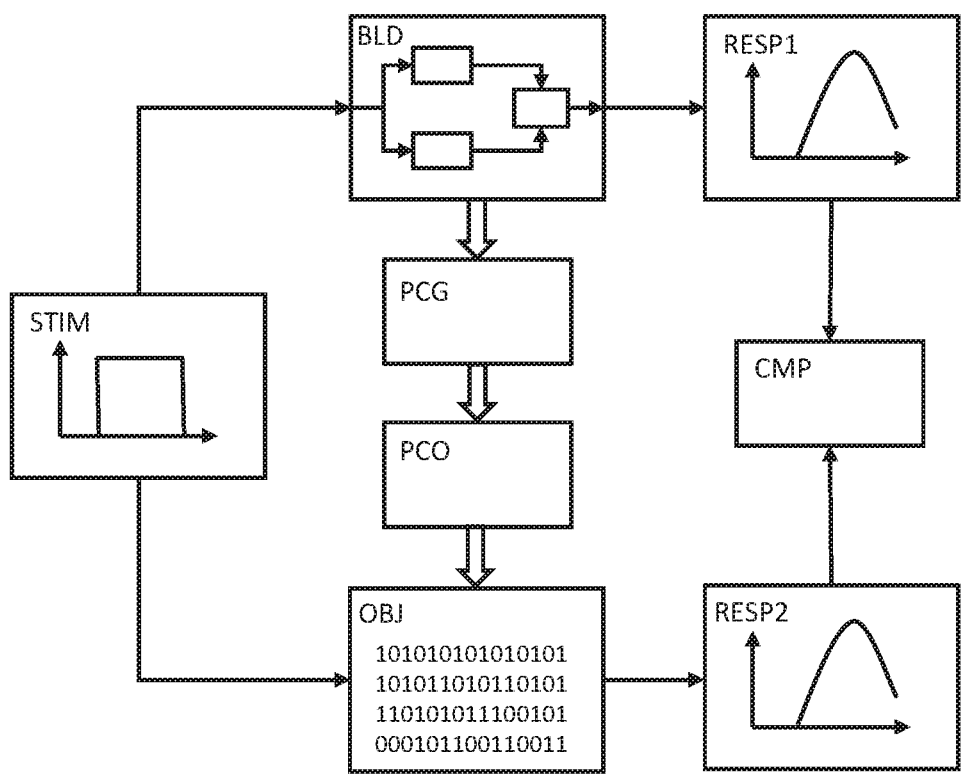
FIG. 4 is an exemplary diagram of a method for testing the compliance of the executable with a model specifying the desired behavior.

FIG. 4 displays an exemplary embodiment of a method for compiling and testing a control program.

The model editor MOD of the TCE preferably comprises a graphical user interface for modifying a block diagram BLD, which may comprise a plurality of blocks interconnected by signal paths. Each block may be an atomic block providing a specific functionality or it may represent a hierarchical block such as a subsystem, which comprise a plurality of subordinate blocks that are shown in a lower hierarchical level. Blocks may be connected by signals which may be of scalar or composite type and which can be represented by arrows indication the direction of the data flow. In the shown example, the block diagram comprises three blocks, an input port for receiving an input signal and an output port for sending an output signal. Preferably, the block diagram describes the predetermined or intended behavior of a control program. Upon activation of the simulation engine in the technical computing environment, the block diagram BLD is executed and results are calculated for each time step. The block diagram may be interpreted directly or it may be converted to an intermediate form that allows for a faster execution in the simulation engine.

Preferably, a number of test cases for the control program have been deduced from the specification and intended application of the control program. Advantageously, a test case comprises a stimulus STIM sent as an input signal to the control program and a corresponding response RESP received as an output signal from the control program. In the shown example, the stimulus STIM is represented by a diagram depicted a particular temporal behavior of the input signal. When the control program is executed in the simulation engine on the host computer, operations corresponding to the block diagram BLD are carried out for a plurality of time steps. During each time step, the current value of the stimulus STIM is fed to the appropriate input ports of the block diagram, the block diagram BLD is being executed in the simulation engine, so that signals are being manipulated and a new internal state of the model may be reached. By simulating the model given in the block diagram for a predetermined duration and by recording the output signal, a response RESP1 can be determined in a model-in-the-loop simulation. A model-in-the-loop simulation mode may be used for verifying that the block diagram executed in the simulation engine accurately describes the intended behavior of the control program. All arithmetic calculations can be carried out with high-precision operations, e.g. using the floating-point data type double for the variables. As a result, the simulation is sufficiently accurate to use the recorded output signals as reference data.

Once correctness of the model has been established and reference data has been stored, the blocks corresponding to the control program are converted to program code via the production code generator PCG. The generated production code is then compiled to object code or an executable using the production code compiler PCO; an object code is binary data that contains instructions for a target processor. When the object code is combined with additional information for the operating system of the host computer, an executable for the host computer is formed. Settings applied during the code generation may comprise a conversion to lower-precision operations that are computationally more efficient, e.g. integer instructions for fixed-point calculations, so that the control program later can be executed in real-time on the microcontroller of an embedded system.

In order to verify that the calculations of the generated code are sufficiently accurate and match the behavior of the blocks in the graphical model, a software-in-the-loop simulation or a processor-in-the-loop simulation may be carried out. The object code or the executable OBJ, which may be in the form of a DLL, contains calculations corresponding to the block diagram. During a predetermined duration, a stimulus STIM is fed to the object code or executable OBJ, and the output signals are recorded to obtain a response RESP2. Generally, multiple variables may be logged while running the simulation; this may comprise adding log macros to the program code prior to the simulation and determine a basic data type of an enumeration signal when initializing the simulation.

The response RESP1 of the model-in-the-loop simulation may be displayed on the host computer simultaneously with the response RESP2 of the generated code, so that a visual comparison may be performed by the user. Additionally or alternatively, the response RESP1 and RESP2 may be compared in a comparison tool CMP, so that a number of checks for compliance to predetermined conditions may be carried out. Preferably, the output signals are compared point by point; in particular, the absolute difference between a data point in RESP1 and the corresponding data point in RESP2 may be calculated. By comparing the differences to a threshold indicating a maximum permissible difference, the correctness of the optimizations applied when generating and compiling the code can be verified.

Figure 5:
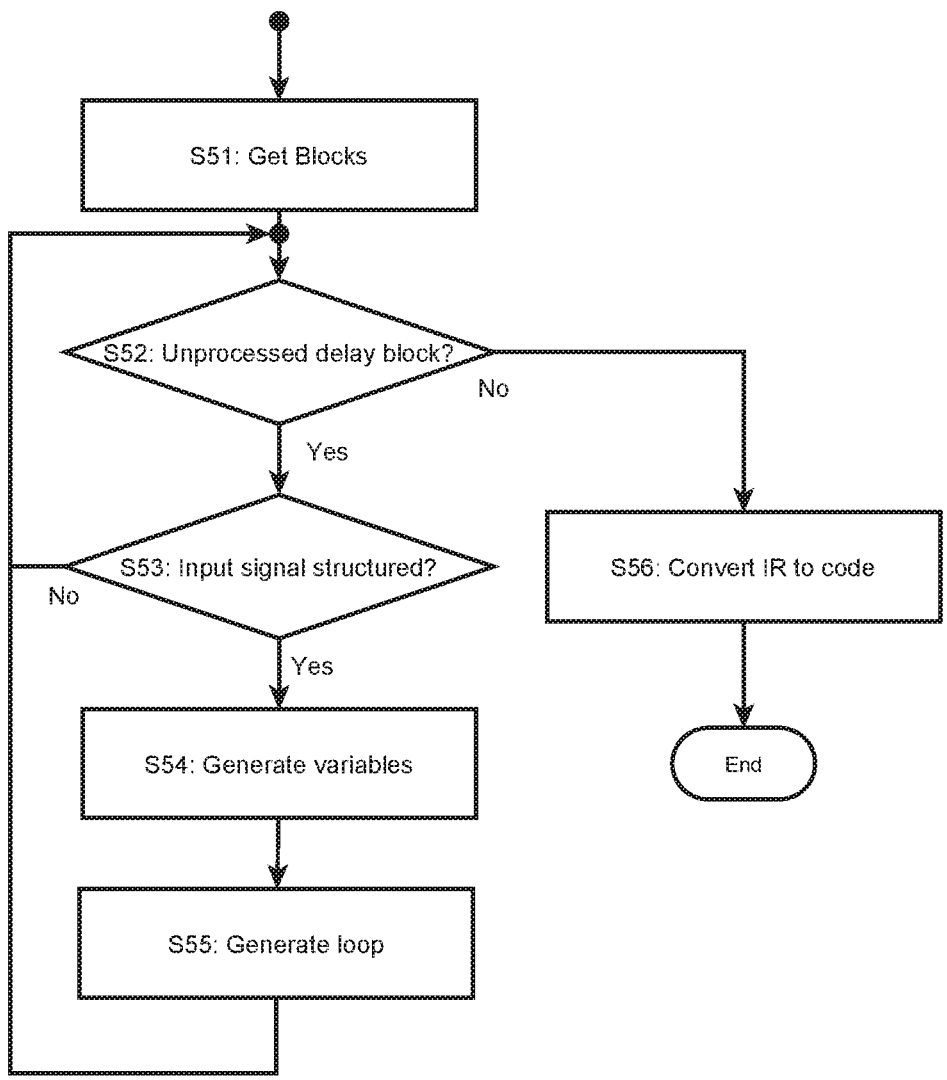
FIG. 5 is a schematic diagram of a method for generating code according to the invention.

FIG. 5 illustrates an embodiment of the inventive method as program flowchart.

In step S51 (Get Blocks), the host computer opens the block diagram selected for code generation in the model editor MOD. Opening the block diagram may encompass determining values of parameters for the model by evaluating expressions in the script interpreter MAT. Generally, a block diagram comprises a plurality of different blocks, such as a plurality of delay blocks, that can be considered individually for code generation; for simplicity, the blocks may be processed sequentially, as will be described in the following. A person skilled in the art will realize that at least some of the steps of the method may be reordered without departing from the spirit of the present invention. Further, it will be understood that some of the steps may be parallelized for speeding up the code generation, especially for host computers being equipped with multicore processors.

In step S52 (Unprocessed delay block?), a processor of the host computer determines if at least one delay block remains that has not been considered. Otherwise, the processor continues in step S56 described below.

When the processor verifies in step S53 (Input signal structured?), that the signal connected to the input port of the current delay block is a composite signal, such as a signal comprising a vector or a matrix of elements, execution continues at step S54. Otherwise, the processor determines in step S52 if a further delay block remains unprocessed.

In step S54 (Generate variables) the processor generates instructions for defining variables used in the block. Settings for the code generation of the block, such as a preferred data type for the variables, may be retrieved from the data definition tool. A first step of the code generation may be performed by inserting nodes in an intermediate representation, such as discussed in connection with FIG. 3 above. Because of the advantage that optimizations can be applied easily to this intermediate representation, the shown example uses a multi-step approach to the code generation. The generated variables comprise a state buffer and an index.

In step S55 (Generate loop), the processor generates code for the loop addressing the elements in the composite signal. The generated code comprises setting a selection pointer to the appropriate position based on the current index, outputting a set of elements from the state buffer and reading in a set of elements from the composite signal to the state buffer; further, a new value for the index is determined. Execution continues in step S52 by determining if any unprocessed delay blocks remain.

The intermediate representation of the block diagram is converted to code in a textual programming language in step S56 (Convert IR to code). The generated code may be compiled and written to a non-volatile memory of an embedded system for execution.

In listing 1, an exemplary code pattern for a delay block receiving a vector signal is given (using the C programming language). The vector signal has a width of 3 elements, and a current value for the vector signal is written to an input buffer In[3] before the loop code for the delay block is executed.

The generated variables comprise a state buffer X_Delay[15], whose length is determined by the vector width of 3 and a selected delay of 5 periods, and an integer Delay_index initialized with zero.

In the generated loop code, a selection pointer *Aux is determined based on the current value of Delay_index. All read and write operations executed during a single time step (period) are positioned relative to this selection pointer. In the shown example, each input/output operation is written out in the generated. Such an unrolling of the loop code is a particularly appropriate optimization for relative small signals with few elements. The loop code comprises outputting a set of elements from the state buffer, for instance by copying the values to an output buffer Delay[3], and inputting a set of elements from the composite signal to the state buffer, for instance by copying values from the input buffer In[3] to the current set of elements in the state buffer. At the end of the loop code, the index variable Delay_index is updated; here this comprises adding 3 and limiting the value by applying a modulo 15 operation, thus ensuring a circular addressing of the sets of elements in the state buffer.

The block following the delay block in the signal stream, i.e. downstream, preferably comprises instructions for reading current values from the utput buffer Delay[3].

Listing 1:
```
Int16 In[3];
Int16 Delay[3];
Int16 X_Delay[15]={{0}};
UInt8 Delay_index=0;
void Unrolled(void)
{
Int16 *Aux=&X_Delay[Delay_index]; /* set pointer */
Delay[0]=Aux[0]; /* output from state buffer */
Delay[1]=Aux[1];
Delay[2]=Aux[2];
Aux[0]=In[0]; /* input to state buffer */
Aux[1]=In[1];
Aux[2]=In[2];
Delay_index=(Delay_index+3) % 15; /* adjust index */
}
```

In listing 2, an exemplary code pattern for a delay block receiving a matrix signal is given (using C). A signal received at the input port of the delay block is delayed by 5 periods before being emitted at the output port (cf. claim 1: n=5). The input signal is a 2×3 matrix comprising 6 elements (cf. claim 1: w=6), that are organized in subsets of 3 elements (cf. claim 1: s=3). Thus, for addressing the next set of elements, a value of 2 (cf. claim 1: w/s=2) needs to be added to the index. By limiting the index to values below 10 (cf. claim 1: n*w/s=10) via a modulo operation, a circular buffer is created.

The general structure of the generated variable definitions and the loop code corresponds to that of listing 1. However, for a larger signal, generating loops is generally more efficient than unrolling the code; for this reason, the shown code comprises loops for addressing the elements in the different rows/columns of the matrix.

Listing 2:
```
Int16 In[2][3];
Int16 Delay[2][3];
Int16 X_Delay[10][3]={{0}};
UInt8 Delay_index=0;
void Loop(void)
{
Int16 Aux_a;
Int16 Aux_b;
Int16 (*Aux)[3]=&X_Delay[Delay_index]; /* set ptr */
for (Aux_a=0; Aux_a<2; ++Aux_a)
  {
  for (Aux_b=0; Aux_b<3; ++Aux_b)
    {
    Delay[Aux_a][Aux_b]=Aux[Aux_a][Aux_b];
    }/* output from state buffer */
  }
for (Aux_a=0; Aux_a<2; ++Aux_a)
  {
  for (Aux_b=0; Aux_b<3; ++Aux_b)
    {
    Aux[Aux_a][Aux_b]=In[Aux_a][Aux_b];
    }/* input to state buffer */
  }
Delay_index=(Delay_index+2) % 10; /* adjust index */
}
```

Figure 6:
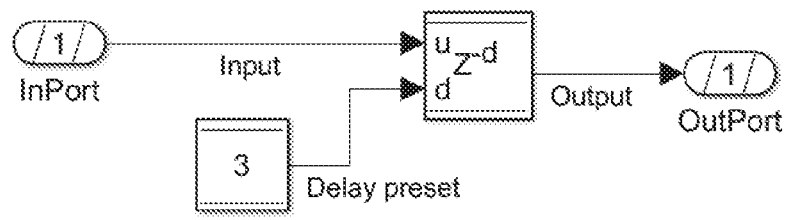
FIG. 6 is an exemplary view of a simple block diagram comprising a delay block.

FIG. 6 displays an exemplary view of a simple block diagram comprising a delay block that allows for adjusting the current delay via a second input signal. An input signal Input is received by the delay block $Z^{-d}$ via an input port InPort. The signal Delay preset for adjusting the current delay is set to a constant value of 3 by a constant block. A delayed output signal Output is transmitted to the output port OutPort.

In listing 3, an exemplary code pattern for the variable delay block of FIG. 6 is given (using C). For simplicity, the input signal is a vector signal with a width of 3 (cf. claim 11: w=3, s=1). The general structure of the generated code resembles that of the listings 1 and 2 given above.

The main difference is in the distinction between a read pointer and a write pointer; while the write pointer is adjusted corresponding to the above examples, an offset of the read pointer depends on the difference between the maximum delay (cf. claim 11: d=10) and the current delay (cf. claim 11: n=3). A current read index $i_r$ can be determined relative to the write index i via the formula $$i_r = \left(i + \frac{(d-n) \cdot w}{s}\right) \bmod \frac{d \cdot w}{s}.$$

Otherwise, a circular buffer is once again realized by a modulo operation (cf. claim 11: d*w/s=30).

Listing 3:
```
Int16 Sa1_InPort[3];
Int16 Sa1_OutPort[3];
void Sa1_Subsystem1(void)
{
UInt8 Aux_U8;
Int16 * pAuxPtr;
Int16 * pAuxPtr_a;
static Int16 X_Sa1_Delay[30]=
{
  /* [0..9] */ 0, 0, 0, 0, 0, 0, 0, 0, 0, 0,
  /* [10..19] */ 0, 0, 0, 0, 0, 0, 0, 0, 0, 0,
  /* [20..29] */ 0, 0, 0, 0, 0, 0, 0, 0, 0, 0
};
static UInt8 X_Sa1_Delay_Index=0;
Aux_U8=(UInt8) (((UInt16) (((UInt16) X_Sa1_Delay_Index)+(30-3*3)) % 30); /* update read index */
pAuxPtr_a=&(X_Sa1_Delay[Aux_U8]); /* read ptr */
Sa1_OutPort[0]=pAuxPtr_a[0]; /* output 1st element*/
pAuxPtr=&(X_Sa1_Delay[X_Sa1_Delay_Index]); /* write ptr */
pAuxPtr[0]=Sa1_InPort[0]; /* input 1st element*/
Sa1_OutPort[1]=pAuxPtr_a[1]; /* output 2nd element*/
pAuxPtr[1]=Sa1_InPort[1]; /* input 2nd element */
Sa1_OutPort[2]=pAuxPtr_a[2]; /* output 3rd element */
pAuxPtr[2]=Sa1_InPort[2]; /*input 3rd element */
X_Sa1_Delay_Index=((UInt8)(X_Sa1_Delay_Index+3)) % 30; /* update write index */
}
```

Realizing the circular buffer via a selection pointer and an index with applied modulo operation allows for a very efficient code that uses both a small buffer and avoids many copy operations that—especially for a larger signal—would be very time consuming. Thus, the generated code uses a considerably lower number of processor cycles than a naïve delay implementation while maintaining good readability.

Those skilled in the art will appreciate that the order of at least some of the steps of the inventive method may be changed without departing from the scope of the claimed invention. While the present invention has been described with respect to a limited number of embodiments, those skilled in the art will appreciate numerous modifications and variations therefrom. It is intended that the appended claims cover all such modifications and variations as fall within the true spirit and scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A method for generating program code based on one or more blocks of a periodically executable block diagram in a technical computing environment, the technical computing environment comprising a model editor and a code generator, the technical computing environment being executed by at least one processor of a host computer, the method comprising:
   opening the block diagram in the model editor, the block diagram comprising a delay block, wherein a signal received by an input port of the delay block is delayed by a number n of periods before being emitted at an output port of the delay block, wherein n is an integer greater than or equal to one;
   determining that a composite signal comprising a number w of elements is connected to the input port of the delay block, wherein w is an integer greater than one;
   generating definitions for variables, the variables comprising a state buffer, a pointer and an index, wherein the state buffer is of a type corresponding to that of the composite signal but comprises n times as many elements, so that the state buffer comprises n sets of elements, wherein the pointer points to a subset comprising a number s of elements of the state buffer, wherein s is an integer greater than or equal to one, wherein the index is an integer and is initially set to zero; and
   generating loop code, the loop code comprising instructions for setting the pointer to a position in the state buffer with an offset of index elements, instructions for outputting the set of elements from the state buffer beginning at the pointer position, instructions for inputting a set of elements of the composite signal to the state buffer beginning at the pointer position, instructions for adding w divided by s to the index and instructions for limiting the index to a value of n times w divided by s via a modulo operation.

2. The method of claim 1, wherein generating variable definitions comprises defining an output buffer, the data type of the output buffer corresponding to that of the composite signal, wherein outputting elements from the state buffer comprises copying the values of said elements from the state buffer to the output buffer.

3. The method of claim 1, wherein generating variable definitions comprises defining an input buffer, the data type of the input buffer corresponding to that of the composite signal, and wherein inputting elements of the composite signal to the state buffer comprises copying the values of said elements from the input buffer to the state buffer.

4. The method of claim 1, wherein the composite signal is a vector, such as a vector comprising integer or floating-point numbers, wherein s equals one.

5. The method of claim 1, wherein the composite signal is a matrix, such as a matrix comprising integer or floating-point numbers, wherein w is divisible by s.

6. The method of claim 5, wherein w divided by s equals the number of rows of the matrix, so that the subset addressed by the pointer is one row of the matrix, wherein the instructions outputting the set of elements from the state buffer comprises instructions for sequentially addressing the rows in one set of elements and instructions for sequentially outputting the elements contained in the row currently addressed.

7. The method of claim 1, wherein the data type of the elements of the composite signal is a scalar type or a composite type, such as a vector or a structure.

8. The method of claim 1, wherein copying all elements of the set or subset is done via an unrolled loop, provided that the value of w or s is lower than a predefined threshold.

9. The method of claim 1, wherein the generated code is MISRA-compliant.

10. The method of claim 1, wherein the technical computing environment comprises a data definition tool, the method further comprising retrieving generation settings for the variables from the data definition tool.

11. A method for generating program code based on one or more blocks of a periodically executable block diagram in a technical computing environment, the technical computing environment comprising a model editor and a code generator, the technical computing environment being executed by at least one processor of a host computer, the method comprising:
   opening the block diagram in the model editor, the block diagram comprising a delay block with a first and a second input port, wherein a signal received by the first input port of the delay block is delayed by a number n of time steps before being emitted at an output port of the delay block, wherein n is determined via a signal received at the second input port, wherein n is an integer greater than or equal to one and smaller than or equal to a predetermined maximum value d, wherein d is an integer greater than one;
   determining that a composite signal comprising a number w of elements is connected to the first input port of the delay block, wherein w is an integer greater than one;
   generating definitions for variables, the variables comprising a state variable, a read pointer, a write pointer and an index, wherein the read pointer and the write pointer point to a subset comprising a number s of elements of the composite signal, respectively, wherein s is an integer greater than or equal to one, wherein the state variable is of a type corresponding to that of the composite variable, but comprises d times as many elements, so that the state buffer comprises n sets of elements, wherein the index is an integer and is initially set to zero; and
   generating loop code, the loop code comprising instructions for setting the write pointer to a position determined by the beginning of the state variable and a write offset of index, setting the read pointer to a position determined by the beginning of the state variable and a read offset of index plus d minus n times w divided by s, wherein the read offset is limited to d times w divided by s via a modulo operation, outputting the set of elements beginning at the read pointer position from the state variable, inputting a set of elements of the composite signal to the state variable beginning at the write pointer position, and adding w divided by s to the index, wherein the index is limited to d times w divided by s via a modulo operation.

12. The method of claim 11, wherein generating variable definitions comprises defining an output buffer, the data type of the output buffer corresponding to that of the composite signal, wherein outputting elements from the state buffer comprises copying the values of said elements from the state buffer to the output buffer.

13. The method of claim 11, wherein generating variable definitions comprises defining an input buffer, the data type of the input buffer corresponding to that of the composite signal, and wherein inputting elements of the composite signal to the state buffer comprises copying the values of said elements from the input buffer to the state buffer.

14. The method of claim 11, wherein the composite signal is a vector, such as a vector comprising integer or floating-point numbers, wherein s equals one.

15. The method of claim 11, wherein the composite signal is a matrix, such as a matrix comprising integer or floating-point numbers, wherein w is divisible by s, wherein w divided by s equals the number of columns/rows of the matrix, so that the subset addressed by the pointer is one column/row of the matrix, wherein the instructions outputting the set of elements from the state buffer comprises instructions for sequentially addressing the columns/rows in one set of elements and instructions for sequentially outputting the elements contained in the column/row currently addressed.

16. The method of claim 11, wherein the data type of the elements of the composite signal is a scalar type or a composite type, such as a vector or a structure.

17. The method of claim 11, wherein the generated code is MISRA-compliant.

18. The method of claim 11, wherein the technical computing environment comprises a data definition tool, the method further comprising retrieving generation settings for the variables from the data definition tool.

19. A non-transitory computer-readable medium containing instructions that, when executed by a processor of a computer system, cause the computer system to carry out the method according to claim 1.

20. A computer system, comprising:
a processor;
a random access memory;
a graphics controller connected to a display;
a serial interface connected to at least one human input device; and
a nonvolatile memory, in particular a hard disk or solid state disk, the nonvolatile memory comprising instructions that, when executed by the processor, cause the computer system to carry out the method according to claim 1.

* * * * *